United States Patent
Abdelli et al.

(10) Patent No.: US 10,840,040 B2
(45) Date of Patent: Nov. 17, 2020

(54) ELECTRIC CONTROL MECHANISM, AND AN AIRCRAFT

(71) Applicant: AIRBUS HELICOPTERS, Marignane (FR)

(72) Inventors: Kamel Abdelli, Marseilles (FR); Olivier Sellier, Eguilles (FR)

(73) Assignee: AIRBUS HELICOPTERS, Marignane (FR)

( * ) Notice: Subject to any disclaimer, the term of this patent is extended or adjusted under 35 U.S.C. 154(b) by 196 days.

(21) Appl. No.: 16/200,919

(22) Filed: Nov. 27, 2018

(65) Prior Publication Data

US 2019/0189373 A1 Jun. 20, 2019

(30) Foreign Application Priority Data

Dec. 19, 2017 (FR) ...................................... 17 71383

(51) Int. Cl.
*H01H 23/14* (2006.01)
*H01H 23/30* (2006.01)
(Continued)

(52) U.S. Cl.
CPC ............. *H01H 23/14* (2013.01); *B64D 31/04* (2013.01); *B64D 35/00* (2013.01);
(Continued)

(58) Field of Classification Search
CPC ........ B64D 31/04; B64D 35/00; H01H 23/14; H01H 23/003; H01H 25/04; H01H 23/30;
(Continued)

(56) References Cited

U.S. PATENT DOCUMENTS

| 3,628,388 A | 12/1971 | Bouthors et al. |
| 5,430,261 A * | 7/1995 | Malone ................ H01H 23/003 200/1 B |

(Continued)

FOREIGN PATENT DOCUMENTS

| EP | 1911629 A1 | 4/2008 |
| EP | 2743953 A1 | 6/2014 |

(Continued)

OTHER PUBLICATIONS

French Search Report for Application No. 1771383, Completed by the French Patent Office, dated Jun. 11, 2018, 7 pages.

*Primary Examiner* — Valentina Xavier
(74) *Attorney, Agent, or Firm* — Brooks Kushman P.C.

(57) ABSTRACT

An electrical control mechanism having a support. A central body that is movable in rotation about a central axis of rotation (AXROTC) carries a button that is movable in rotation relative to the central body about an offset axis of rotation (AXROTD) parallel to the central axis of rotation (AXROTC). First return means are interposed between the central body and the button, with second return means being interposed between the central body and the support. Two primary electric switches are interposed between the button and the central body on either side of a plane containing the central axis of rotation (AXROTC) and the offset axis of rotation (AXROTD). Two secondary electric switches are interposed between the support and the central body on either side of the plane.

17 Claims, 3 Drawing Sheets

(51) Int. Cl.
  *B64D 31/04*   (2006.01)
  *B64D 35/00*   (2006.01)
  *H01H 23/00*   (2006.01)
  *H01H 25/04*   (2006.01)

(52) U.S. Cl.
  CPC .......... *H01H 23/003* (2013.01); *H01H 23/30* (2013.01); *H01H 25/04* (2013.01); *H01H 2205/002* (2013.01); *H01H 2205/004* (2013.01); *H01H 2221/016* (2013.01); *H01H 2225/014* (2013.01); *H01H 2235/028* (2013.01); *H01H 2239/03* (2013.01)

(58) Field of Classification Search
  CPC ....... H01H 2235/028; H01H 2205/002; H01H 2205/004; H01H 2221/016; H01H 2225/014; H01H 2239/03
  See application file for complete search history.

(56) References Cited

U.S. PATENT DOCUMENTS

| | | | | |
|---|---|---|---|---|
| 5,719,361 | A * | 2/1998 | Lee | H01H 23/003 200/1 B |
| 6,774,321 | B2 * | 8/2004 | Komatsu | H01H 23/003 200/1 B |
| 6,809,272 | B2 * | 10/2004 | Yamada | H01H 13/48 200/1 B |
| 2009/0301255 | A1 * | 12/2009 | Chanteloup | G05G 5/05 74/504 |
| 2018/0099739 | A1 | 4/2018 | Salesse-Lavergne et al. | |
| 2019/0096612 | A1 * | 3/2019 | Ebelsberger | H01H 33/40 |

FOREIGN PATENT DOCUMENTS

| | | |
|---|---|---|
| FR | 1601481 A | 8/1970 |
| WO | 2016043942 A2 | 3/2016 |
| WO | 2016043943 A2 | 3/2016 |

* cited by examiner

ELECTRIC CONTROL MECHANISM, AND AN AIRCRAFT

CROSS-REFERENCE TO RELATED APPLICATIONS

This application claims priority to French patent application No. FR 1771383 filed on Dec. 19, 2017, the disclosure of which is incorporated in its entirety by reference herein.

BACKGROUND OF THE INVENTION

(1) Field of the Invention

The present invention relates to an electric control mechanism and to an aircraft.

In particular, the electric control mechanism is adapted to control the collective pitch of the blades of a propeller or of a rotor of an aircraft.

2) Description of Related Art

By way of example, a control mechanism may comprise a rocker button in the form of a hat button, i.e. in the form of an upside-down V-shape in section. The control mechanism may be arranged at the top of a stick so that the pilot of an aircraft can manipulate it with a thumb, for example.

It is advantageous to be able to detect accurately the instant at which the pilot voluntarily issues a control order by manipulating the control mechanism, and also to be able to detect a failure of the control mechanism. Specifically, a control order may be given involuntarily as a result of a nervous movement of the pilot's thumb. However, an erratic and/or undesired control order can turn out to be troublesome on board an aircraft, e.g. while flying close to an obstacle.

Furthermore, such a rocker button may be used to increase the collective pitch of the blades of a propeller or of a rotor when the button is rocked in a first direction from a neutral position. Moving the rocker button from the neutral position in a second direction leads, on the contrary, to the collective pitch being reduced.

Nevertheless, when the pilot rocks the button in the first direction, the button returning towards a neutral position might be wrongly considered as a control signal to reduce the collective pitch.

Documents WO 2016/043942 and WO 2016/043943 are known and remote from the invention. Document WO 2016/043942 describes a control mechanism that has a rotary button. The rotary button is constrained to turn with a shaft of a motor. An encoder then determines the angular position of the shaft.

Document WO 2016/043943 describes a control mechanism having a button that is movable between a neutral position and a plurality of non-neutral positions. A first non-neutral position causes the pitch of the blades of a propeller to vary in a first direction, a second non-neutral position causes the pitch of the blades of a propeller to vary in a second direction, and a third non-neutral position causes the blades of a propeller to move into positions that give rise to the propeller generating zero thrust.

Document FR 16/01481 or US 2018/0099739 describes an electric control device provided with manipulation means. The electric control device has a first measurement system and a second measurement system that take respectively a first measurement and a second measurement of the current position of the manipulation means. A processor unit compares the first measurement and the second measurement in order to generate a control signal as a function of said current position, said processor unit considering that the manipulation means are in a neutral position when the first measurement and the second measurement do not correspond to the same position of the manipulation means. Documents EP 1 911 629 and EP 2 743 953 have been considered.

BRIEF SUMMARY OF THE INVENTION

An object of the present invention is thus to propose a control mechanism capable of detecting the presence of a control signal that has been given voluntarily by the manipulation button being moved away from a neutral position, and of generating a stop control signal while the manipulation button is returning towards the neutral position.

Such an electrical control mechanism is provided with a support and a button. For example, the button is a rocker button, and for example it is a hat button.

The electric control mechanism comprises a central body arranged in the support, the central body presenting only one degree of freedom to move relative to the support specifically in rotation about a central axis of rotation. The button is carried by the central body and presents only one degree of freedom to move relative to the central body, specifically in rotation about an offset axis of rotation. The axis of rotation is parallel to the central axis of rotation. First return means are interposed between the central body and the button and exert a force on the button in order to position it in a neutral position, second return means being interposed between the central body and the support and exerting a force on the central body in order to position said button in said neutral position. The control mechanism has two primary electric switches interposed between the button and the central body on either side of a plane containing said central axis of rotation and said offset axis of rotation in order to detect a movement in rotation of the button relative to the central body, said control mechanism having two secondary electric switches interposed between the support and the central body on either side of said plane in order to detect a movement in rotation of the central body relative to the support.

The term "interposed" means that the associated switch changes state as a function of relative movement between the associated members.

Under such circumstances, the control mechanism has two members that are movable in rotation, namely the central body and the button. Each movable member is associated with return means tending to place the button in a neutral position at rest.

Furthermore, the button is mounted to be movable in rotation on the central body. Consequently, when a pilot exerts a force voluntarily on the button, the button and the central body both perform respective movements in rotation in the same direction.

The control mechanism then has four switches for detecting a movement in rotation of the button and of the central body in two opposite directions. The two primary switches are thus arranged between the button and the central body to detect a movement in rotation of the button about its offset axis of rotation in two opposite directions, and two secondary switches are arranged between the central body and the support in order to detect a movement in rotation of the central body about its central axis of rotation in two opposite directions.

Each switch may comprise two electric contacts arranged on the associated elements, e.g. by a plastronic method. When the two contacts of a switch touch each other, the switch is then in a closed state, whereas otherwise the switch is in an open state. The state of a switch may be determined by conventional means, e.g. by performing an impedance measurement.

Such a control mechanism makes it possible to determine accurately whether a control signal is given voluntarily. If the control signal is given voluntarily, the pilot's movements cause both the button and the central body to move in rotation. Under such circumstances, both a primary switch and an associated secondary switch change state when the control signal is given voluntarily. If the pilot's finger or thumb in contact with the button vibrates nervously, then only the button or only the central body moves so the control signal is not taken into consideration.

Furthermore, the control mechanism makes it possible to determine accurately when the pilot decides to stop issuing the control signal. Under such circumstances, the return means return the button to the neutral position. Nevertheless, the button and the body may move at different speeds and/or may require different strokes in order to change state. This movement can be detected quickly by the change of state of only one switch, thereby enabling the control signal to be stopped quickly, i.e. before the button has returned to its neutral position.

When controlling the collective pitch of a rotor or of a propeller, a movement of the button in the clockwise direction or in the counterclockwise direction causes the collective pitch of the blades to be varied in positive or negative manner. Once the button is released, the switches enable this release to be detected in order to stop pitch variation quickly and in order to avoid the movement of the button towards its neutral position giving rise to an undesired "residual" control effect, where the time required by the button to return to its neutral position depends specifically on the return mechanism.

The control mechanism thus serves to provide double confirmation of a control signal to vary pitch by causing both the central body and the button to turn through an angle, and it also enables the stopping of this pitch variation control signal to be detected quickly and on a priority basis. In the context of a propeller or a rotor, this characteristic serves to make blade pitch control reliable in an unprecedented manner.

The control mechanism may include one or more of the following additional characteristics.

Thus, a radius of a circle centered on said central axis of rotation may be contained in said plane.

Under such circumstances, the plane extends diametrically relative to the circle. Where applicable, the circle may extend along a face having the shape of a spherical cap on a core of the body.

The offset axis of rotation is thus offset radially relative to the central axis of rotation with reference to a circle centered on that central axis of rotation.

In another aspect, the support may be locally open to an external medium, the button extending at least in part in the external medium.

The entire button or only a portion of the button is located outside the support in order to be manipulated by a pilot.

In a variant, the first return means may present stiffness greater than the stiffness of the second return means.

In a variant, the first return means may present stiffness less than the stiffness of the second return means.

When a pilot exerts a voluntary force on the button, the central body is then necessarily set into movement after the button has already moved in rotation relative to the central body. This configuration makes it possible to be certain that the primary switches and the secondary switches are operated during the movements of the button and of the central body.

In an aspect, the first return means may include at least two resilient members situated on either side of said plane, each resilient member having stiffness less than the second return means.

For example, each resilient member may comprise a spring and/or a block of elastomer.

Each resilient member may extend from a face of the central body to a face of the button.

The two resilient members may be arranged symmetrically on either side of said plane.

Each of the two resilient members may exert a force on the button tending to place the primary switches in their closed states.

The two resilient members may be sufficiently stiff to position the primary switches in their closed states by countering the acceleration force to which the button is subjected while it is returning towards the neutral position.

In an aspect, the second return means may comprise a spring secured to said support and to said central body.

For example, the support may include a cage carrying a pivot rod, with the central body being movable in rotation about said pivot rod. Optionally, the second return means may include a spring fastened to the pivot rod and to the central body.

In an aspect, each of the two primary switches may comprise an internal primary metal contact fastened to the central body and an external primary metal contact fastened to the button, the internal primary metal contact of each primary switch being in contact with the external primary metal contact of that primary switch when the button is in the neutral position.

Each of the primary switches is at a closed state at rest, i.e. when the button is in its neutral position.

During a waiting stage, a pilot may tend to keep a finger or thumb permanently in position on the button so as to be ready to generate a control signal quickly by manipulating the button. Keeping the primary switches in the closed state at rest makes it possible to avoid pressure from the pilot's finger or thumb during such a waiting stage giving rise to a change of state in the primary switches. The primary switches are in their closed state before the pilot places a finger or thumb on the button, and they remain in the closed state so long as the pilot does not move the button.

In an aspect, each of the internal primary metal contacts and the external primary metal contacts of each of said two primary switches may comprise an elastically deformable primary spring blade.

The primary spring blades of a primary switch can thus deform, e.g. by flattening when the button performs a movement in rotation relative to the central body.

In an aspect, each of two secondary switches may comprise an internal secondary metal contact fastened to the central body and an external secondary metal contact fastened to the support, the internal secondary metal contact of a secondary switch not being in contact with the external secondary metal contact of that secondary switch when the button is in the neutral position.

Each of the secondary switches is then in an open state at rest, i.e. when the button is in its neutral position.

In an aspect, the internal secondary metal contact of each of said two secondary switches comprises an elastically deformable secondary spring blade, and said external secondary metal contacts of each of said two secondary switches comprises a spring blade suitable for being in contact against the spring blade that is elastically deformable or optionally not deformable or being circularly arcuate in shape.

The secondary spring blade of a secondary switch can thus extend from the support to the central body when the secondary switch is open in order to guide movement in rotation of the central body. The secondary spring blade then flattens when the secondary spring blade comes into contact with the spring blade of the secondary switch. The spring blade of a secondary switch may be given dimensions so as to present a length that is greater than the maximum angular stroke of the central body.

In an aspect, the external primary metal contacts of said two primary switches and said external secondary metal contacts of said two secondary switches are connected respectively to four electrical output connections for connecting to an electrical ground.

In an aspect, the internal primary metal contacts of said two primary switches and said internal secondary metal contacts of said two secondary switches are respectively connected to four electrical input connections for connecting to a source of electricity.

Optionally, a sensor serves to measure a voltage or an impedance between the electrical input connection and the electrical output connection of a switch in order to detect the state of the switch.

In an aspect, when said button is in the neutral position:
said internal primary metal contacts of said two primary switches may be arranged symmetrically on either side of said plane;
said internal secondary metal contacts of said two secondary switches may be arranged symmetrically on either side of said plane;
said external primary metal contacts of said two primary switches may be arranged symmetrically on either side of said plane; and
said external secondary metal contacts of said two secondary switches may be arranged symmetrically on either side of said plane.

In an aspect, the central body may be hinged to the support via a central pivot connection, the button being hinged to the central body by an offset pivot connection.

In an aspect, the central body may include a central core arranged around a pivot rod of the support, said core carrying a peg via a connection rod, said button including a socket in which the peg is arranged.

Such a peg may be a cylinder, the button being engaged on the cylinder so as to have only one degree of freedom to move in rotation relative to the cylinder, and thus relative to the central body.

The invention also provides an aircraft including at least one propulsion system generating thrust, e.g. a propeller or a rotor.

The aircraft may then include an electrical control mechanism of the invention, said electric control mechanism being connected to the propulsion system in order to control said thrust, at least in part.

When the propulsion system comprises a plurality of variable pitch blades that are movable in rotation, the propulsion system includes a pitch modification system for modifying said pitch and the control mechanism may be connected to calculation means, with said calculation means controlling said pitch modification system.

Independent and priority control of the control mechanism can make it possible on request to position the blades in a position that generates zero thrust.

In addition, the invention also provides a method of controlling a propulsion system with the control mechanism of the invention.

Without action by the pilot, the method includes a step of positioning the button is in the neutral position, said two primary electric switches and said two secondary electric switches being either in a closed initial state or else in an open initial state. The method then comprises the following steps in succession:

generating and transmitting an order to modify thrust generated by said propulsion system when only one primary electric switch and one secondary electric switch situated on either side of said plane change state; and stopping said transmission as soon as one of said primary electric switch and said secondary electric switch that have changed state returns to its initial state.

In an embodiment, in the neutral position, both primary electric switches are in a closed state and both secondary electric switches are in an open state. The table below gives the control signals that can be generated by calculation means as a function of the state of the various switches.

| First secondary switch | Second secondary switch | First primary switch | Secondary primary switch | Control signal issued |
|---|---|---|---|---|
| open | open | open | open | None |
| open | open | open | closed | None |
| open | open | closed | open | |
| open | open | closed | closed | |
| open | closed | open | open | None |
| open | closed | open | closed | Negative thrust variation |
| open | closed | closed | open | None |
| open | closed | closed | closed | Stop negative thrust variation |
| closed | open | open | open | None |
| closed | open | open | closed | None |
| closed | open | closed | open | Positive thrust variation |
| closed | open | closed | closed | Stop positive thrust variation |
| closed | closed | open | open | None |
| closed | closed | open | closed | |
| closed | closed | closed | open | |
| closed | closed | closed | closed | |

The stroke of the secondary switches may in particular be adjusted so that the primary switches close before a secondary switch in a closed state opens when the pilot releases the button.

BRIEF DESCRIPTION OF THE DRAWINGS

The invention and its advantages appear in greater detail in the context of the following description of examples given by way of illustration with reference to the accompanying figures, in which.

Elements present in more than one of the figures are given the same references in each of them.

DETAILED DESCRIPTION OF THE INVENTION

Figure 1:
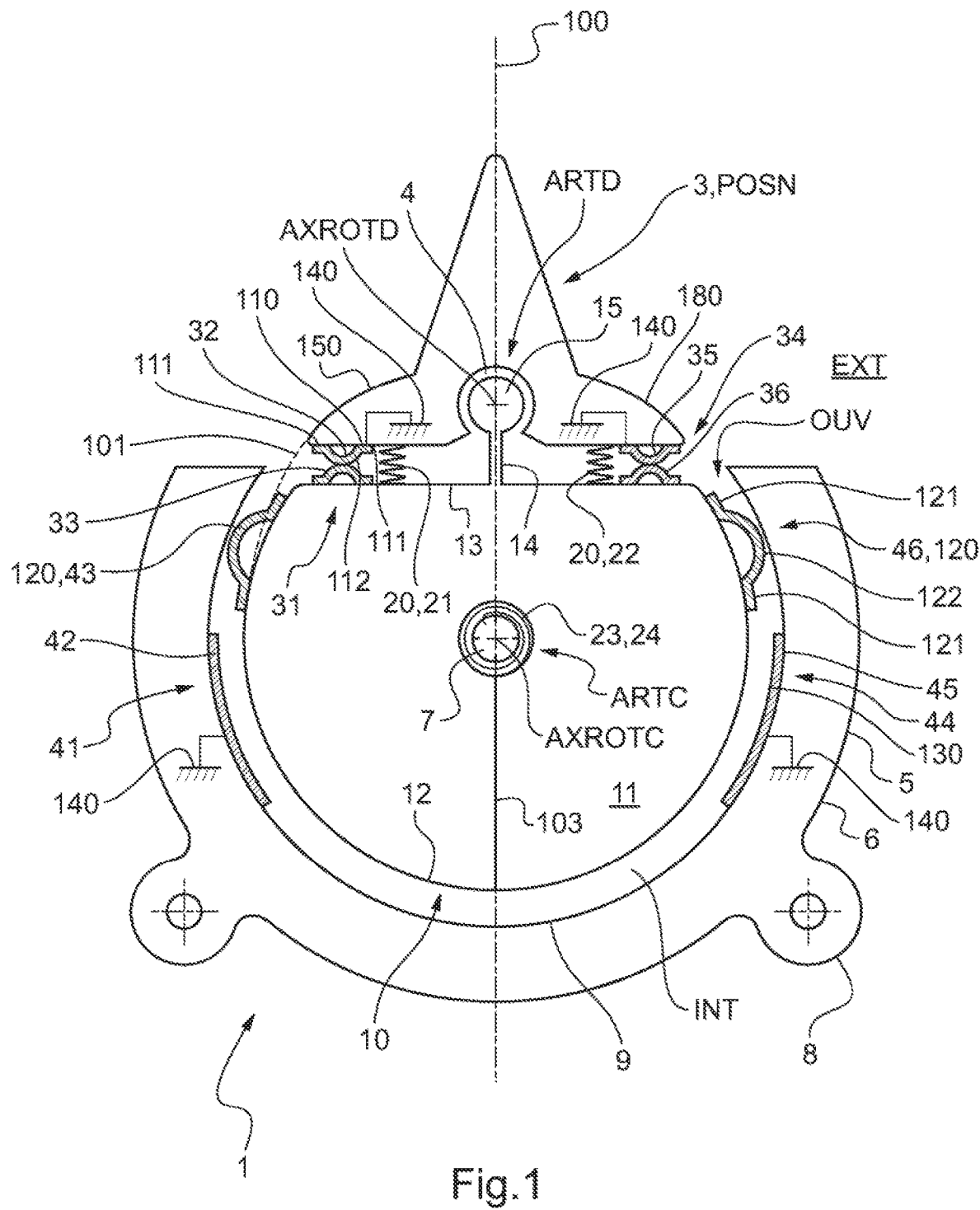
FIG. 1 is a diagram showing a control mechanism of the invention.

FIG. 1 shows a control mechanism 1 of the type of the invention.

The control mechanism 1 has a support 5. The support 5 includes an outer cage 6. The outer cage 6 separates an internal space INT present inside the support 5 from an external medium EXT situated outside the support 5. Nevertheless, the outer cage 6 presents an opening OUV putting the internal space INT into communication with the external medium EXT.

The outer cage may have an inner support face 9 facing the internal space INT. This inner support face 9 may be in the form of a truncated cylinder on a circular base or it may be in the form of a spherical cap, for example.

The outer cage 6 may include fastener means 8 enabling the control mechanism to be fastened to a control member, e.g. a control stick. In the example shown, the fastener means comprise lugs 8 for screw-fastening to a member.

Furthermore, the control mechanism 1 has a central body 10. The central body 10 is arranged at least in part and possibly entirely in the internal space INT of the support 5.

The central body 10 presents only one degree of freedom to move relative to the support 5, specifically in rotation about a central axis of rotation AXROTC. Under such circumstances, the central body 10 may be hinged by a central pivot connection ARTC to the support 5. Optionally, the central pivot connection ARTC comprises a pivot rod 7 secured to the outer cage 6, the central axis of rotation AXROTC representing an axis of symmetry of the pivot rod 7. Under such circumstances, the central body 10 has a core 11 engaged around the pivot rod 7. Optionally, the central pivot connection ARTC may have at least one member facilitating turning of the core 11 about the pivot rod 7, e.g. a ball bearing or the equivalent, and/or a smooth bearing.

Furthermore, the core 11 presents an outer core face 12 facing the inner support face 9. This outer core face 12 may be in the form of a truncated cylinder on a circular base, or indeed it may be in the form of a spherical cap, for example.

In another aspect, the control mechanism 1 includes a button 3. The term "button" refers to a member that can be moved by a pilot. In the example of FIG. 1, the button is a hat-shaped button.

The button 3 extends at least in part and possibly completely in the external medium EXT, at least when the button 3 is arranged in the "neutral" position as shown in FIG. 1.

The button 3 is carried by the central body 10. Nevertheless, the button 3 presents at least one degree of freedom to move relative to the central body 10, possibly a single degree of freedom to move relative to the central body 10, i.e. a degree of freedom to move in rotation about an offset axis of rotation AXROTD.

This offset axis of rotation AXROTD is parallel to the central axis of rotation AXROTC. Furthermore, the offset axis of rotation AXROTD and the central axis of rotation AXROTC are coplanar, by being contained in a common plane 100. This plane 100 may be a plane of symmetry of the central body 10, or of the button 3 when in the neutral position POSN. This plane 100 may also contain a radius 103 of a circle 101 centered on the central axis of rotation AXROTC. Such a circle may match locally the inner face of the support 9 or a face 180 of the button 3. Under such circumstances, the offset axis of rotation AXROTD is offset radially relative to the central axis of rotation AXROTC.

Under such circumstances, the button 3 may be hinged by an offset pivot connection ARTD to the support 5. Optionally, the offset pivot connection ARTD comprises a connection rod 14 secured to the core. This connection rod 14 may extend along an axis, or indeed have an axis of symmetry, that is contained in the plane 100. The offset pivot connection ARTD may also include a peg 15, the connection rod 14 then extending from one end secured to the core 11 to another end secured to the peg 15. Under such circumstances, the button 3 is engaged around the peg 15, the peg 15 being arranged in a socket 4 inside the button 3. The offset pivot connection ARTD may optionally include at least one member for enhancing turning of the button 3 about the peg 15 such as a ball or similar bearing and/or a smooth bearing, . . . , for example.

Furthermore, the control mechanism 1 includes first return means 20 and second return means 23.

Figure 2:
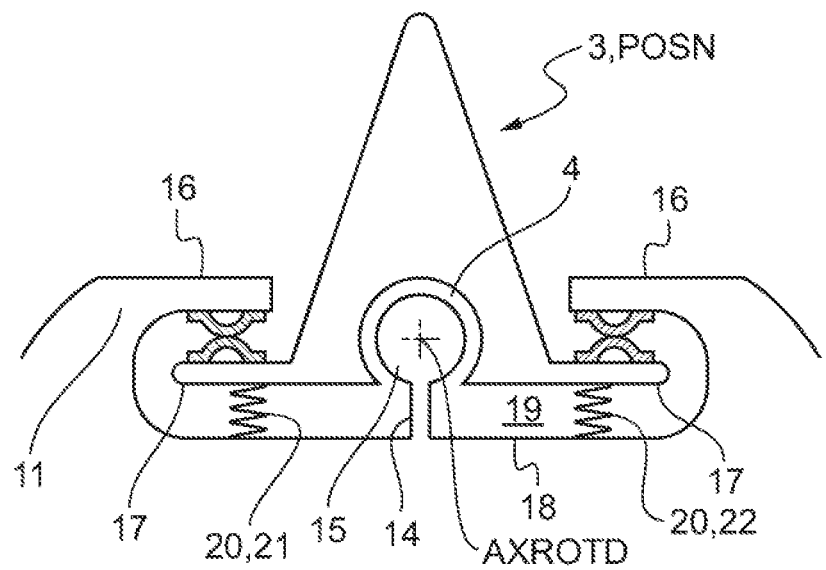
FIG. 2 is a diagram showing an arrangement of a button.

The button 3 turning about the central axis of rotation AXROTD in a clockwise or counterclockwise direction leads to the central body 10 turning about the central axis of rotation AXROTC in the same direction, respectively clockwise or counterclockwise. Optionally, as shown in FIGS. 1 and 2, e.g. in order to send a control signal to cause a positive variation in the collective pitch of blades, the button 3 is manipulated in order to cause the button 3 and the central body 10 to move in the same clockwise direction opposed by the first return means 20 and the second return means 23. In the same example, in order to send a control signal to cause a negative variation in the collective pitch, the button 3 is manipulated to cause the button 3 and the central body 10 to move in the same counterclockwise direction, against the returns means 20 and 23.

The first return means 20 and the second return means 23 exert respective forces on the button 3 and the central body 10 in order to position the button 3 in the neutral position POSN. Optionally, the first return means 20 present stiffness less than the stiffness of the second return means 23. Each resilient member of the first return means 20 may thus present stiffness less than the stiffness of each member of the second return means 23. The first return means 20 are interfaced between the central body 10 and the button 3. For example, the first return means 20 comprise at least one first resilient member 21 and at least one second resilient member 22 situated on either side of the plane 100, possibly in symmetrical manner. For example, the first return means 20 comprise at least one pair of resilient members situated on either side of the plane 100. Each resilient member 21, 21 may then present stiffness that is less than the second return means 23.

In the illustration of FIG. 1, the button 3 is situated above the core 11 relative to a direction going from the central axis of rotation AXROTC towards the offset axis of rotation AXROTD. Each resilient member can then extend from a top of the core 11 to a bottom of the button 3.

In the illustration of FIG. 2, the button 3 has fins 17 situated in a notch 19 in the core 11 of the central body 10. Such a notch 19 in the core may be defined by an inside face 18 of the core carrying the connection rod 14 and two margins 16, the margins being substantially parallel to the inside face 18, for example. Under such circumstances, each resilient member may extend between the inside face 18 of the core and a fin 17 of the button 3. Independently of this aspect, and with reference to FIG. 1, the second return means 23 are interfaced between the central body 10 and the support 5. For example, the second return means 23 comprise a spring 24 secured to the support 5 and to the central body 10. Each resilient member 21, 22 may then present stiffness less than the spring 24. By way of example, such a spring 24 may be fastened to the pivot rod 7 and to the core 11 of the central body 10.

Furthermore, the control mechanism 1 includes two primary electric switches 31 and 34 for determining the position of the button 3 relative to the central body 10. These two primary switches 31 and 34 are interposed between the button 3 and the central body 10. Furthermore, these two primary switches 31 and 34 comprise a first primary switch 31 and a second primary switch 34 disposed on either side of the plane 100, at least when in the neutral position, and thus on either side of the connection rod 14. By way of example, the first resilient member 21 is arranged laterally between the plane 100 and the first primary switch 31, the second resilient member 22 being arranged laterally between the plane 100 and the second primary switch 34. Each primary switch 31, 34 is provided with an internal primary metal contact 33, 36 fastened to the central body 10, and with an external primary metal contact 32, 35 fastened to the button 3. Thus, the first primary switch 31 has a first internal primary metal contact 33 fastened to the central body 10 and a first external primary metal contact 32 fastened to the button 3, the second primary switch 31 having a second internal primary metal contact 36 fastened to the central body 10 and a second external primary metal contact 35 fastened to the button 3. When the button 3 is in the neutral position, the first internal primary metal contact 33 and the second internal primary metal contact 36 may for example be arranged symmetrically on either side of said plane 100. Likewise, the first external primary metal contact 32 and the second external primary metal contact 35 may for example be arranged symmetrically on either side of said plane 100.

In addition, the internal primary metal contact 33, 36 of each primary switch 31, 34 is then in contact with the external primary metal contact 32, 35 of the primary switch 31, 34. Thus, the first internal primary metal contact 33 of the first primary switch 31 is then in contact with the first external primary metal contact 32 of the first primary switch 31. Likewise, the second internal primary metal contact 36 of the second primary switch 34 is then in contact with the second external primary metal contact 35 of the second primary switch 34.

Optionally, each internal primary metal contact 33, 36 and each external primary metal contact 32, 35 comprises a respective elastically deformable primary spring blade 110. Each primary spring blade 110 may have a rounded central segment 112 that can be flattened and that is placed between two end segments 111 fastened to the member in question.

Furthermore, the control mechanism has at least two secondary electric switches 41 and 44 for determining the position of the central body 10 relative to the support 5. These two secondary switches 41, 44 are then arranged between the support 5 and the central body 10. Furthermore, these two secondary switches 41, 44 comprise a first secondary switch 41 and a second secondary switch 44 arranged on either side of the plane 100.

Each secondary switch 41, 44 has an internal secondary metal contact 43, 46 fastened to the central body 10, e.g. on the outer face of the core 12, and an external secondary metal contact 42, 45 fastened to the support 5, e.g. on the inner face of the support 9. Thus, the first secondary switch 41 has a first internal secondary metal contact 43 fastened to the central body 10 and a first external secondary metal contact 42 fastened to the support 5. Likewise, the second secondary switch 44 comprises a second internal secondary metal contact 46 fastened to the central body 10 and a second external secondary metal contact 45 fastened to the support 5.

When the button 3 is in the neutral position, the first internal secondary metal contact 43 and the second internal secondary metal contact 46 are arranged symmetrically on either side of said plane 100, for example. Likewise, the first external secondary metal contact 42 and the second external secondary metal contact 45 are arranged symmetrically on either side of said plane 100, for example.

In addition, the internal secondary metal contact 43, 46 of a secondary switch 41, 44 when in this neutral position is not in contact with the external secondary metal contacts 42, 45 of that secondary switch 41, 44. Thus, the first internal secondary metal contact 43 of the first secondary switch 41 is not in contact with the first external secondary metal contact 42 of that first secondary switch 41. Likewise, the second internal secondary metal contact 46 of the second secondary switch 44 is not in contact with the second external secondary metal contact 45 of that second secondary switch 44.

In another aspect, the internal secondary metal contact 43, 46 of each secondary switch 41, 44 may comprise an elastically deformable secondary spring blade 120. Such a secondary spring blade 120 may comprise a rounded central segment 122 suitable for flattening and that is located between two end segments 121 that are fastened to the outer face of the core 12 of the central body 10.

In addition, the external secondary metal contacts 42, 45 of each secondary switch 41, 44 may include a spring blade 130 placed adjacent to the inner face of the support 9.

In another aspect, the two external primary metal contacts 32, 35 of the two primary switches 31, 34 and the two external secondary metal contacts 42, 45 of the two secondary switches 41, 44 are connected respectively to four electrical output connections 151, 152, 153, and 154. Each electrical output connection may comprise at least one wire and/or at least one electrical track.

Likewise, the two internal primary metal contacts 33, 36 of the two primary switches 31, 34, and the two internal secondary metal contacts 43, 46 of the two secondary switches 41, 44 are connected respectively to four electrical input connections 141, 142, 143, and 144. Each electrical input connection may comprise at least one wire and/or at least one electrical track.

Figure 3:
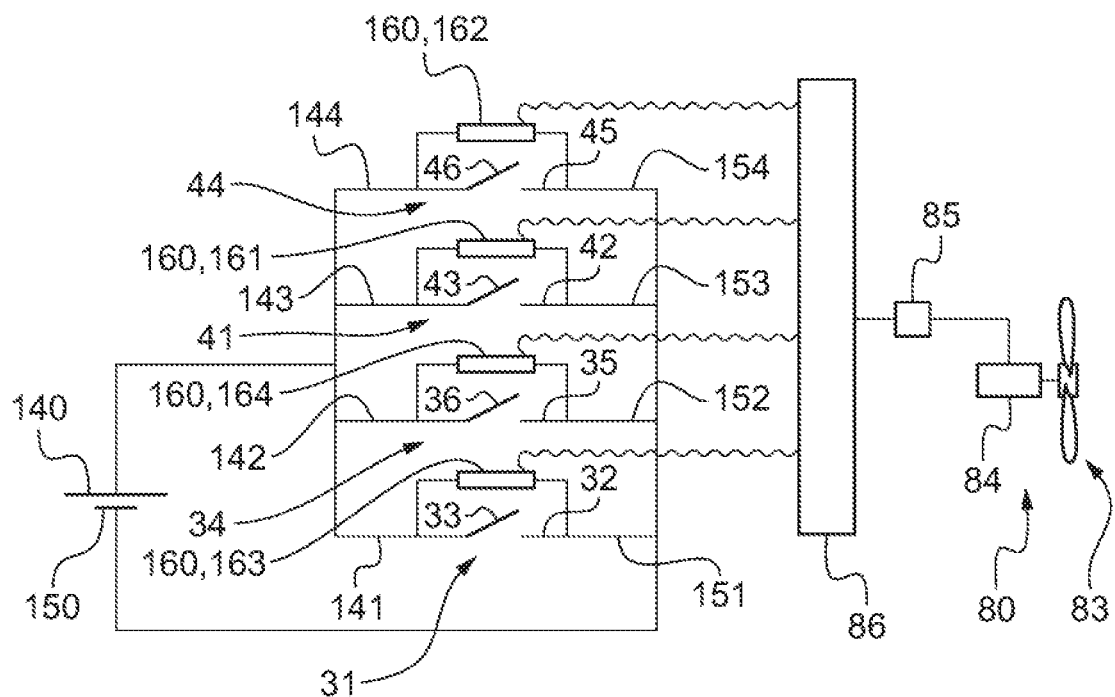
FIG. 3 is a diagram showing a system having a control mechanism of the invention.

With reference to FIG. 3, the control mechanism may be integrated in a controlled assembly having a member that is controlled by the control mechanism.

Under such circumstances, the four electrical output connections 151, 152, 153, and 154 are connected to an electrical ground 150 and the four electrical input connections 141, 142, 143, and 144 are connected to a source of electricity 140.

Under such circumstances, the controlled assembly includes calculation means 86 for generating a control signal as a function of the angular position of the button relative to the central body, and of the angular position of the central body relative to the support.

By way of example, the calculation means 86 may comprise a processor, an integrated circuit, a programmable system, a logic circuit, these examples not being limiting on the scope to be given to the term "calculation means".

In order to evaluate the position of the movable body and of the button, the controlled assembly may include at least one sensor 160 monitoring the manipulation mechanism, each sensor being connected to the calculation means via a wired or wireless connection. For example, a first impedance sensor 161 may be connected in parallel with the first secondary switch 41, a second impedance sensor 162 may be connected in parallel with the second secondary switch 44, a third impedance sensor 163 may be connected in parallel with the first primary switch 31, and a fourth impedance sensor 164 may be connected in parallel with the second primary switch 34.

When a sensor measures a high impedance, the sensor sends a signal to the calculation means indicating that the associated switch is open.

As a result of the data that is obtained, the calculation means can then control at least one actuator, e.g. an actuator 85 of a propulsion system 80. In the example shown, the actuator 85 then controls a servo-control 84, which servo-control controls the pitch of the blades 83 of a rotor or of a propeller.

For example, the two secondary switches 41, 44 and the two primary switches 31, 34 are either in a closed initial state or else in an open initial state when the button is in the neutral position.

The calculation means then generate and transmit a control signal for modifying thrust generated by said propulsion system 80 when only one primary electric switch and only one secondary electric switch is situated on either side of said plane changes state.

Furthermore, the calculation means cease transmitting said control signal as soon as one of the primary and secondary electric switches that has changed state returns to its initial state.

More precisely, the two secondary switches may be in an open state and the two primary switches may be in a closed state when the button is in the neutral position.

If the first primary switch opens and the second secondary switch closes, then the calculation means generate a control signal for reducing the thrust generated by the propulsion system by requesting retraction of the actuator 85. If the first primary switch closes while the second secondary switch remains closed, then the calculation means maintain the actuator in the position reached.

Likewise, if the second primary switch opens and the first secondary switch closes, then the calculation means generate a control signal to increase the thrust generated by the propulsion system by requesting extension of the actuator 85. If the second primary switch 31 closes while the second secondary switch 44 remains closed, then the calculation means maintain the actuator in the position reached.

Figure 4:
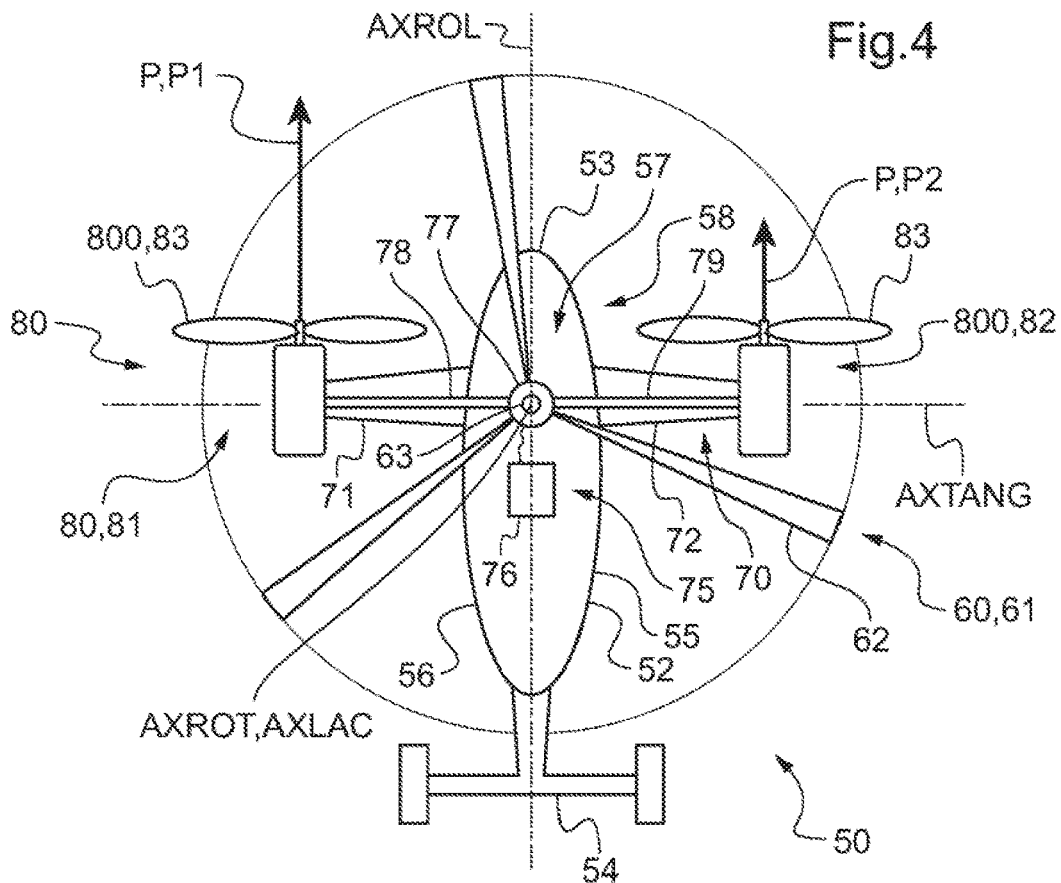
FIGS. 4 and 5 are diagrams showing an aircraft having a control mechanism of the invention.
Figure 5:
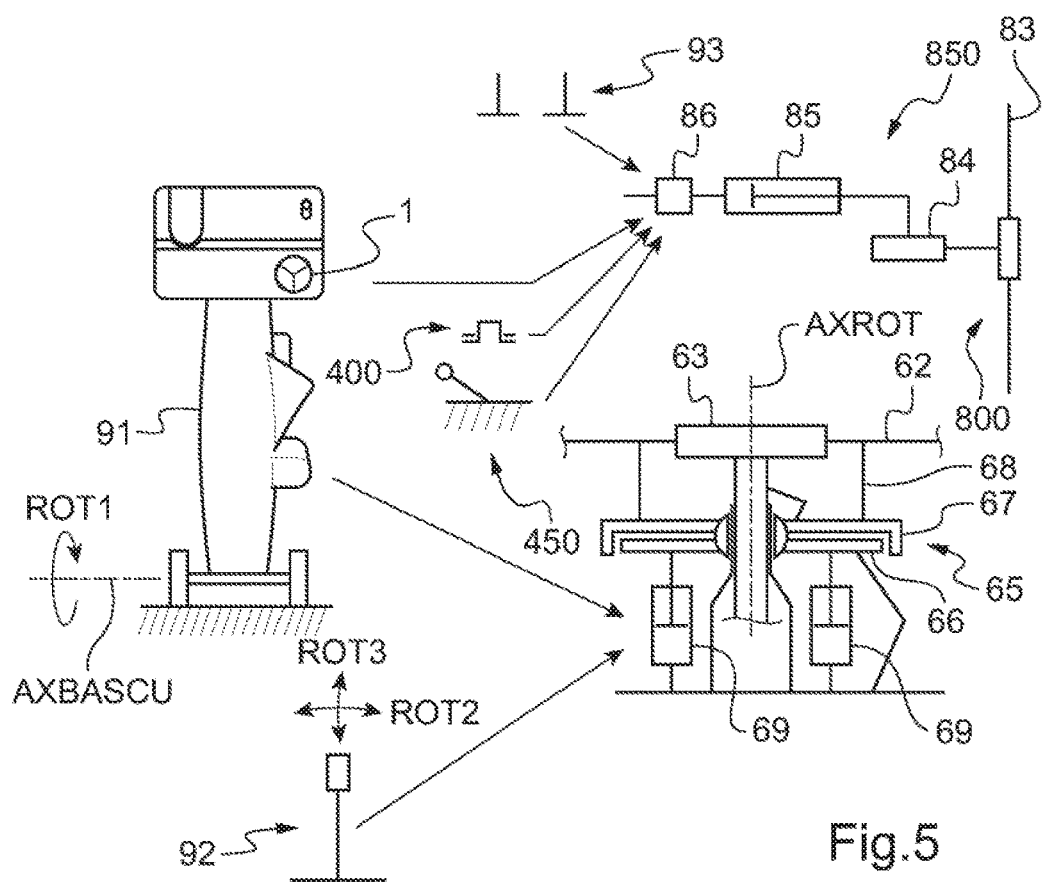

FIGS. 4 and 5 show an example aircraft 50 having at least one propulsion system 80 controlled by a control mechanism 1 of the invention.

Thus, and with reference to FIG. 4, the electrical control mechanism 1 of the invention may be arranged on an aircraft, and for example on a rotorcraft or rotary wing aircraft 50.

The aircraft 50 has a fuselage 52. The fuselage 52 extends longitudinally from a tail 54 to a nose 53 along a roll axis AXROL. Furthermore, the fuselage extends transversely along a pitching axis AXTANG from a first flank referred to for convenience as the "left" flank 56 to a second flank referred to for convenience as the "right" flank 55, and as seen from the rear of the aircraft. Finally, the fuselage extends in elevation from a bottom surface 58 to a top surface 57 along a yaw axis AXLAC. The roll axis AXROL and the yaw axis AXLAC together define a vertical antero-posterior plane of symmetry of the rotorcraft 1.

Conventionally, landing gear may project downwards from the bottom surface 58 of the fuselage.

The aircraft has a rotary wing 60 comprising at least one main rotor 61. The main rotor 61 lies above the top surface 57 of the fuselage 52. The main rotor 61 is provided with a plurality of blades 62, e.g. connected to a hub 63. These blades 63 are referred to as "main" blades, for convenience.

The main rotor rotates about an axis referred to as the "main" axis of rotation AXROT in order to contribute at least in part to providing the aircraft with lift and possibly also with propulsion.

Furthermore, the aircraft 50 has a propulsion system 80 providing longitudinal thrust P in order to contribute to moving the rotorcraft. The propulsion system 80 may serve to push or to pull the rotorcraft.

The propulsion system 80 may comprise at least one propeller 800 having a plurality of variable pitch blades 83.

By way of example, the aircraft then possesses a lift surface 70 that extends substantially transversely on either side of the fuselage. By way of example, the lift surface 70 may comprise a left half-wing 71 extending from the left flank 56 and a right half-wing 72 extending from the right flank 55.

The lift surface then carries a propeller 800 referred to as the "first" propeller 81 and a propeller 800 referred to as the "second" propeller 82. By way of example, the left half-wing 71 carries the first propeller 81 and the right half-wing 72 carries the second propeller 82. The first and second propellers 81 and 82 are then arranged transversely on either side of the fuselage 52.

Each propeller produces thrust P1, P2 so that together they generate longitudinal thrust P. The first thrust P1 generated by the first propeller 81 may differ from the second thrust P2 generated by the second propeller 82 in order to control the yaw movement of the rotorcraft.

Furthermore, the aircraft 50 has a power plant 75 for driving rotation of the first propeller 81, of the second propeller 82, and of the main rotor 60.

Such a power plant 75 may comprise at least one engine 76 and a drive train connecting the engine to the first propeller 81 and to the second propeller 82 and to the main rotor 60.

By way of example, the drive train includes a main power transmission gearbox 77 having a rotor mast for driving the main rotor in rotation. Furthermore, the main gearbox may be connected to a first transmission 78 driving rotation of the first propeller 81. Likewise, the main gearbox may be connected to a second transmission 79 driving the second propeller 82 in rotation.

Other architectures can be envisaged.

With reference to FIG. 5, the aircraft 50 has numerous flight controls for controlling the movement of the rotorcraft.

Specifically, the pitch of the blades of the main rotor can be modified both collectively and cyclically.

For example, the aircraft 50 has a set of swashplates 65 comprising a stationary swashplate 66 and a rotary swashplate 67. The stationary swashplate 66 is connected to at least three "main" actuators 69, e.g. of servo-control type. The rotary swashplate 67 is connected to each blade 82 of the main rotor via respective pitch rod 68.

Under such circumstances, the aircraft 50 may include a collective pitch lever 91. The collective pitch lever 91 can move in rotation ROT1 about a tilt axis AXBASCU in order to control the main actuators in the same manner.

Furthermore, the aircraft 50 may have a cyclic stick 92. The cyclic stick 92 may move in rotation ROT2 about a first axis and may move in rotation ROT3 about a second axis in order to control the main actuators in differing manners in order to control the attitude of the aircraft 50.

In addition, the pitch of the blades 83 of each propeller 800 may be modified by a pitch modification system 850.

By way of illustration, a pitch modification system 850 for a propeller may comprise a hydraulic valve controlling a servo-control 84 by delivering hydraulic feed to an actuator. The actuator may be arranged in a hub of the propeller by a perforated long shaft. The hydraulic valve may be controlled by a transmission including an electric actuator 85, for example. The electric actuator may be controlled by calculation means 86.

Pedals 93 may communicate with the calculation means 86 in order to control yaw movement of the aircraft by means of a thrust difference between the first thrust exerted by the first propeller and the second thrust exerted by the second propeller.

In order to control the magnitude of the longitudinal thrust, an electrical control mechanism 1 of the invention may be used. For example, the button 3 may be arranged on the collective pitch lever 91.

Under such circumstances, the control signals issued by the electrical control mechanism 1 are sent to the calculation means 86. As a function of the signals it receives, the calculation means 86 then control the pitch modification systems 850 of the propellers to modify the blade pitch of the propellers.

For example, the calculation means apply at least one mathematical relationship or interrogate a database in order to generate control signals for modifying the pitch of the blades of the propellers that correspond to an amount of pitch variation required by the electrical control mechanism 1.

Specifically, the positioning of the pitches of the propellers may be servo-controlled firstly by generating a control signal transmitted to the calculation means 86, and secondly by a position sensor measuring information about the pitch of a blade. Such a position sensor may be connected to the calculation means 86. Furthermore, the position sensor may be arranged very close to the blades, e.g. at a hydraulic valve 84. The calculation means 86 then control the electric actuator 85 to comply with the control signal received, and to do so with reference to information returned by the position sensor.

Furthermore, the aircraft 50 may include an emergency electrical manipulation member 400 connected to the propulsion system 80. By way of example, this emergency electrical manipulation member 400 may be in the form of a pushbutton connected to the calculation means 86.

In another aspect, the aircraft 50 may include an emergency mechanical manipulation member 450 connected to the propulsion system. Such an emergency mechanical manipulation member 450 may comprise a lever that moves the electrical actuator 85, for example.

Naturally, the present invention may be subjected to numerous variations as to its implementation. Although several embodiments are described, it will readily be understood that it is not conceivable to identify exhaustively all possible embodiments. It is natural possible to envisage replacing any of the means described by equivalent means without going beyond the ambit of the present invention.

For example, the control mechanism may be used for purposes other than controlling the pitch of rotorcraft propeller blades, e.g. for controlling the pitch of the blades of the tail rotor of a helicopter that also has a main rotor, for controlling the pitch of an airplane propeller, for controlling some other type of propulsion means.

What is claimed is:

1. An electrical control mechanism having a support and a button, the control mechanism comprising a central body arranged in the support, the button being carried by the central body and presenting a degree of freedom to move relative to the central body, an offset axis of rotation (AXROTD) of the button being parallel to a central axis of rotation (AXROTC), first return means being interposed between the central body and the button and exerting a force on the button in order to position it in a neutral position (POSN), second return means being interposed between the central body and the support and exerting a force on the central body in order to position the button in the neutral position (POSN), wherein the central body presents only one degree of freedom to move relative to the support in rotation about the central axis of rotation (AXROTC), the button presenting only one degree of freedom to move relative to the central body in rotation about the offset axis of rotation (AXROTD), the control mechanism having two primary electric switches interposed between the button and the central body on either side of a plane containing the central axis of rotation (AXROTC) and the offset axis of rotation (AXROTD) in order to detect a movement in rotation of the button relative to the central body, the control mechanism having two secondary electric switches interposed between the support and the central body on either side of the plane in order to detect a movement in rotation of the central body relative to the support, and wherein the first return means present stiffness less than the stiffness of the second return means.

2. The control mechanism according to claim 1, wherein a radius of a circle centered on the central axis of rotation (AXROTC) is contained in the plane.

3. The control mechanism according to claim 1, wherein the support is locally open to an external medium (EXT), the button extending at least in part in the external medium (EXT).

4. The control mechanism according to claim 1, wherein the first return means include at least two resilient members situated on either side of the plane, each resilient member having stiffness less than the second return means.

5. The control mechanism according to claim 1, wherein the second return means comprise a spring secured to the support and to the central body.

6. The control mechanism according to claim 1, wherein each of the two primary switches comprises an internal primary metal contact fastened to the central body and an external primary metal contact fastened to the button, the internal primary metal contact of each primary switch being in contact with the external primary metal contact of that primary switch when the button is in the neutral position.

7. The control mechanism according to claim 6, wherein each of the internal primary metal contacts and the external primary metal contacts of each of the two primary switches comprises an elastically deformable primary spring blade.

8. The control mechanism according to claim 1, wherein each of two secondary switches comprises an internal secondary metal contact fastened to the central body and an external secondary metal contact fastened to the support, the internal secondary metal contact of a secondary switch not being in contact with the external secondary metal contact of that secondary switch when the button is in the neutral position.

9. The control mechanism according to claim 8, wherein the internal secondary metal contact of each of the two secondary switches comprises an elastically deformable secondary spring blade, and the external secondary metal contacts of each of the two secondary switches comprises a spring blade suitable for being in contact against the elastically deformable secondary spring blade of that secondary switch.

10. The control mechanism according to claim 6, wherein each of two secondary switches comprises an internal secondary metal contact fastened to the central body and an external secondary metal contact fastened to the support, the internal secondary metal contact of a secondary switch not being in contact with the external secondary metal contact of that secondary switch when the button is in the neutral position, and wherein the external primary metal contacts of the two primary switches and the external secondary metal contacts of the two secondary switches are connected respectively to four electrical output connections for connecting to an electrical ground.

11. The control mechanism according to claim 6, wherein each of two secondary switches comprises an internal secondary metal contact fastened to the central body and an external secondary metal contact fastened to the support, the internal secondary metal contact of a secondary switch not being in contact with the external secondary metal contact of that secondary switch when the button is in the neutral position, and wherein the internal primary metal contacts of the two primary switches and the internal secondary metal contacts of the two secondary switches are respectively connected to four electrical input connections for connecting to a source of electricity.

12. The control mechanism according to claim 1, wherein when the button is in the neutral position:
  internal primary metal contacts of the two primary switches are arranged symmetrically on either side of the plane;
  internal secondary metal contacts of the two secondary switches are arranged symmetrically on either side of the plane;
  external primary metal contacts of the two primary switches are arranged symmetrically on either side of the plane; and
  external secondary metal contacts of the two secondary switches are arranged symmetrically on either side of the plane.

13. The control mechanism according to claim 1, wherein the central body is hinged to the support via a central pivot connection (ARTC), the button being hinged to the central body by an offset pivot connection (ARID).

14. The control mechanism according to claim 1, wherein the central body includes a central core arranged around a pivot rod of the support, the core carrying a peg via a connection rod, the button including a socket in which the peg is arranged.

15. An aircraft including at least one propulsion system generating thrust, wherein the aircraft includes an electrical control mechanism according to claim 1, the electrical control mechanism being connected to the propulsion system to control the thrust, at least in part.

16. The aircraft according to claim 15, wherein the propulsion system includes a plurality of variable pitch blades, and the propulsion system includes a pitch modification system for modifying the pitch, the control mechanism being connected to calculation means and the calculation means controlling the pitch modification system.

17. A method of controlling a propulsion system by means of a control mechanism according to claim 1, wherein while the button is in the neutral position, the two primary electric switches and the two secondary electric switches are either in a closed initial state or else in an open initial state, and the method comprises the following steps in succession:
  generating and transmitting a control signal to modify thrust generated by the propulsion system when only one primary electric switch and one secondary electric switch situated on either side of the plane change state; and
  stopping the transmission as soon as one of the primary electric switch and the secondary electric switch that have changed state returns to its initial state.

* * * * *